Aug. 12, 1958     D. L. VAUGHAN     2,847,077
AUTOMATIC MOWING MACHINE GUIDE

Filed Jan. 3, 1956     3 Sheets-Sheet 1

INVENTOR
Delmas L. Vaughan
BY
Stone + Mack.
ATTORNEYS

Aug. 12, 1958 D. L. VAUGHAN 2,847,077
AUTOMATIC MOWING MACHINE GUIDE
Filed Jan. 3, 1956 3 Sheets-Sheet 2
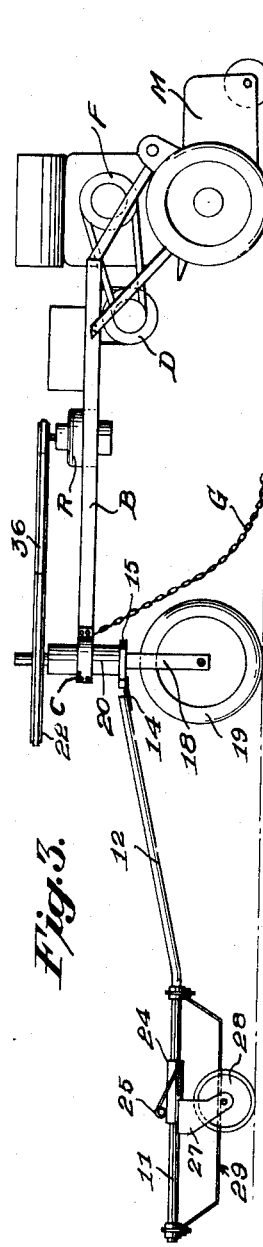
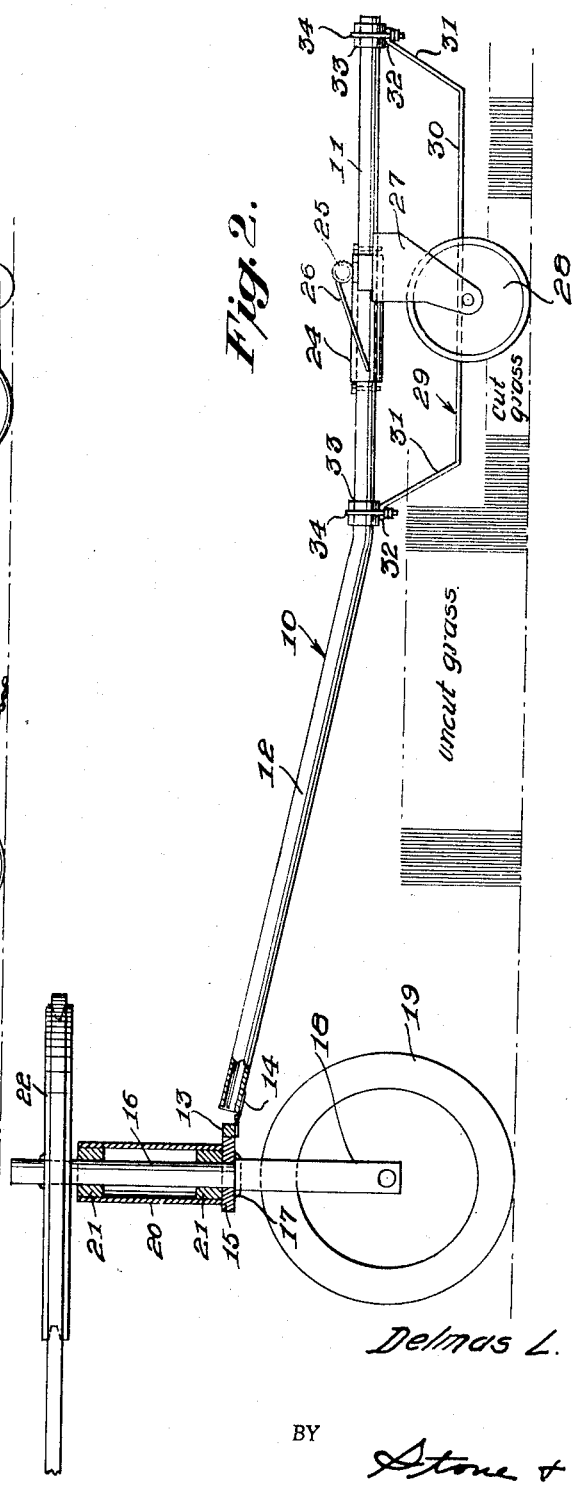
INVENTOR
Delmas L. Vaughan.
BY
Stone + Mack.
ATTORNEYS.

2,847,077
AUTOMATIC MOWING MACHINE GUIDE

Delmas Leon Vaughan, Monroe County, Ind.

Application January 3, 1956, Serial No. 556,978

5 Claims. (Cl. 180—79.1)

This invention relates to an automatic guiding attachment for mowing machines and harvesters.

A primary feature of the invention is the provision of a guiding attachment including an electrically charged arm or bar adapted to move forwardly of a mowing machine or harvester substantially in the vertical plane of separation of mowed and unmowed plant growth. In this apparatus an electric circuit is completed upon movement of the arm into the unmowed plant growth and the circuit is broken upon movement of the arm away from the unmowed plant growth to a position above the mowed plant growth. This arrangement further requires that said arm be connected with a guide wheel for the mowing machine or harvester, and includes a reversible motor having a steering connection with said guide wheel, and wherein means are provided for reversing said motor upon making and breaking of the said circuit.

A further feature of the invention is the provision of a support for said arm embodying a pair of ground engageable swivel casters disposed at opposite sides of the arm.

A still further feature of the invention is the provision of a guiding attachment of the above noted general character which is of relatively simple construction, readily attachable to existing mowing machines or harvesters, and which is highly dependable in operation.

Other features and advantages of the invention will become apparent in the course of the following detailed description, taken in connection with the accompanying drawings, wherein:

Fig. 2 is a side elevational view of the guiding attachment with parts thereof in vertical section;

Fig. 3 is a side elevational view of the guiding attachment on a reduced scale and wherein the guiding attachment is shown in operative connection with a mowing machine;

Figure 1:
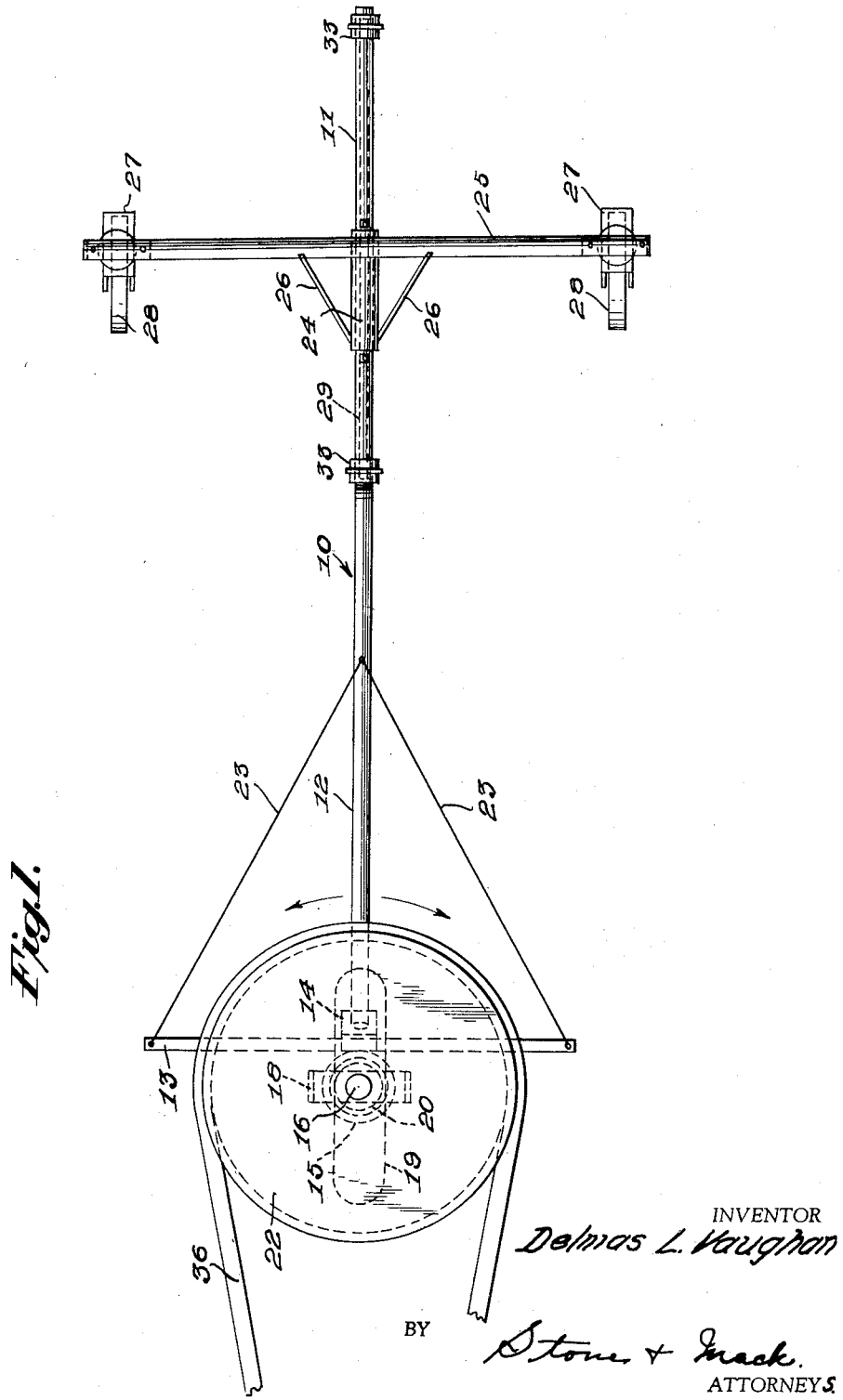
Fig. 1 is a top plan view of the guiding attachment.

Referring now in detail to the drawings, and first to Figs. 1 and 2 thereof, the attachment in a preferred structural embodiment thereof will be seen to comprise an elongated tubular member 10 which as shown in Fig. 2 is bent intermediate its ends in the provision of angular portions 11 and 12.

As is indicated in Fig. 2 the forward tubular portion 11 in operative position of the structure is substantially horizontal while the rear tubular portion 12 is inclined upwardly from the portion 11 and the rear end thereof is connected to a transverse arm 13 by means of a horizontal pivot hinge 14 and the arm 13 is rigidly secured to a washer 15.

A vertical shaft 16 extends through the washer 15 and is rigidly secured thereto as indicated at 17 and the lower end of shaft 16 is provided with a fork 18 in which is rotatably supported a mowing machine or harvester guide wheel 19.

Surrounding the shaft 16 with its lower end resting on the washer 15 is a tube 20 of substantially greater internal diameter than the diameter of shaft 16 and a pair of bronze bearings 21 are forced into opposite ends of the tube 20 since, in operation, there is relative rotation between shaft 16 and the tube 20 as will later appear.

Secured to the upper end of shaft 16 is a relatively large diameter V-belt pulley 22.

Since the relatively long transversely disposed arm 13 is adapted to move with the tubular portion 12, a pair of guy wires 23 are preferably employed with their rear ends connected to opposite ends of the arm and with their adjacent ends connected to the tubular portion 12 at a point substantially remote from the arm 13. The forward tubular portion 11 extends through and is rigidly connected to a relatively short tube 24 and a tube 25 is disposed transversely of the tube 24 and rigidly supported intermediate its ends on the upper wall of tube 24 adjacent the forward end thereof. A pair of brace members 26 are preferably utilized with their opposite ends rigidly secured to the tubes 24 and 25.

Swivelly supported on opposite ends of the tube 25 are the brackets 27 of swivel casters 28.

An important feature of the invention is a feeler or hunting bar 29 which as indicated in Fig. 2 is of generally shallow U-form and including a relatively long horizontal portion 30 and upwardly diverging end portions 31 which terminate in horizontally disposed feet 32.

The bar 29 is an electrical conductor and accordingly same is secured to tubular portion 11 by insulating members 33, preferably of rubber and U-bolts 34 with the members 33 resting on the feet 32.

The above described structure is a unitary device which is adapted for ready connection with a mowing machine M (Fig. 3) by means of a suitable bracket B having detachable connection C with the said tube 20, and wherein the usual handle bars of the mowing machine have been removed. The mowing machine M or bracket B supports a grounding chain G and in order to carry the invention into effect the mowing machine M or bracket B is provided with a reversible motor R and a dual-output generator D which may conveniently be driven from a fly wheel F on the mowing machine motor. At this point, it is to be understood that the mowing machine M is shown solely for the purpose of disclosing a single specific operative embodiment of the automatic guiding attachment, and no claim of novelty is made to the mowing machine per se.

It is to be particularly noted that the conductor bar 29 is of a height to be above the cut grass or plant growth, as indicated in Fig. 2, but the height thereof is such that it will be below the top of the uncut grass or plant growth.

The conductor bar is charged by the generator D and accordingly when same is in the uncut grass a circuit is established from the bar 29 through the uncut grass and up the chain G, and when the bar moves out of the uncut grass the circuit is broken, the object in view being of course to maintain the bar 29 adjacent the vertical plane between the cut and uncut grass whereby the guide wheel 19 which is movable with bar 29 will cause the mowing machine to cut a substantially uniform width of grass.

The bar 29 is controlled by the reversible motor R which has a driving connection with the pulley 22 by means of a V-belt 36.

Figure 4:
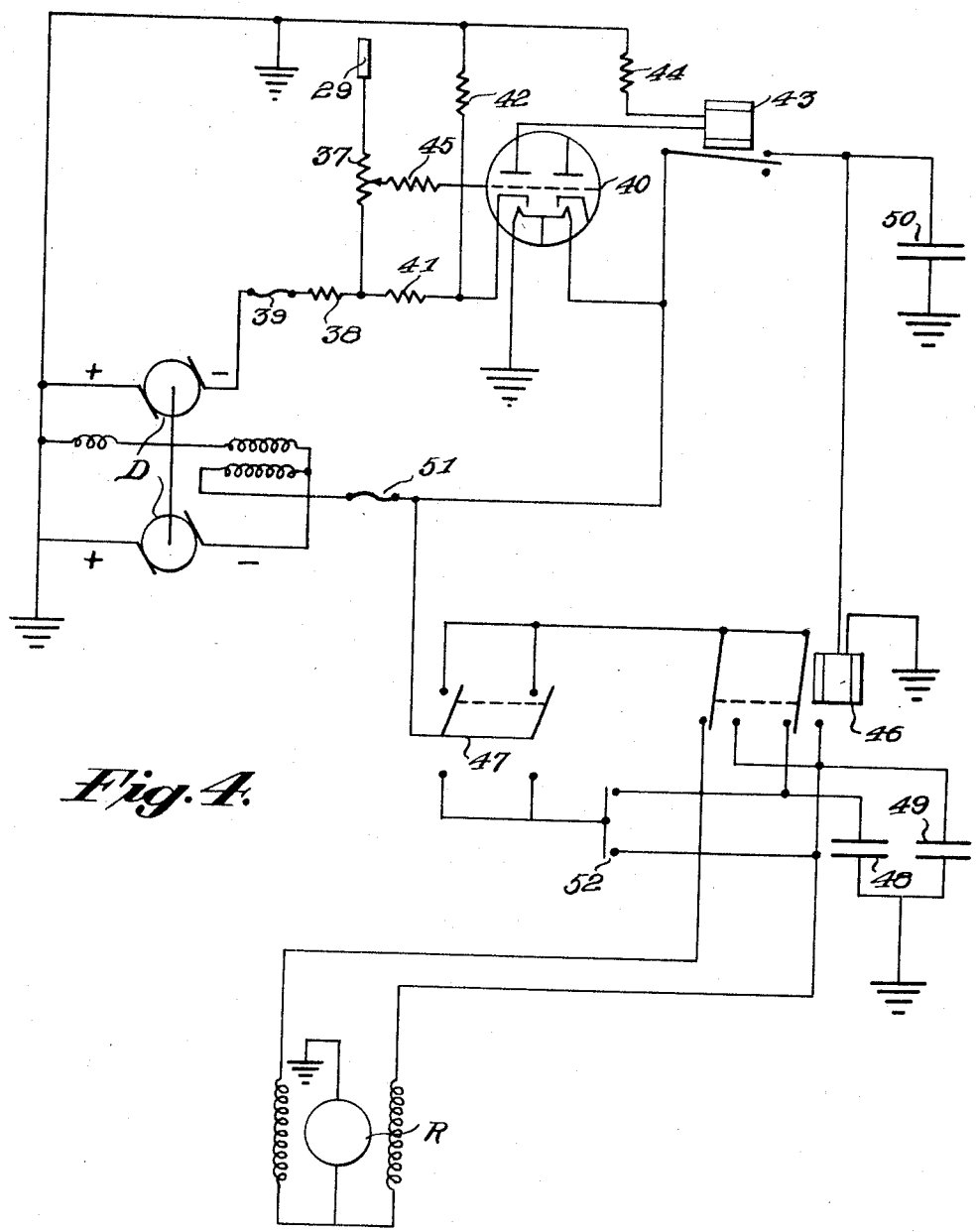
Fig. 4 is a diagram showing the several cooperating electric features for reversing the guide control motor.

For an understanding of the operation of the guiding attachment, reference will now be had to Fig. 4.

All of the current for the guiding attachment is delivered from the dual generator D which supplies 12 volts D. C. and 240 volts D. C. when driven at a speed of 3450 R. P. M.

The generator is driven by the mowing machine motor as indicated in Fig. 3.

The positive sides of both windings of the dual generator are grounded to the mowing machine M which in turn is grounded to the plant life by means of the dragging chain G. The feeler bar 29 is connected through a 5 meg. potentiometer 37, a 1500 ohm resistor 38, and a 60 milliampere fuse 39 to the negative side of the 240 volt generator winding. The purpose of the resistor 38 is to reduce the effective voltage of the 240 volt generator winding to 180 volts. This limits the maximum voltage on the feeler bar 29 and the maximum voltage between the cathode and grid of the tube 40 to 180 volts.

With the feeler bar 29 in the uncut or unmowed grass or plant life, current will flow through the plant life, the feeler bar 29, and the potentiometer 37. From here current flows back to the generator D. The voltage drop across the potentiometer 37 due to the current flowing through it counteracts the bias on the amplifier tube 40 produced by resistors 41 and 42. This permits current to flow through the plate circuit of the tube 40 and through the coil of the relay 43. This closes the relay 43.

Current flowing through the plate of the tube 40 is limited by the resistor 44 and the grid current is limited by the resistor 45. With the relay 43 closed, current will flow through the coil of the relay 46 and cause it to close. With the manual-automatic switch 47 in the automatic position, current will now flow through one field coil and the armature of the guiding motor R. This swings the feeler bar 29 and simultaneously turns the guiding wheel 19 in the direction of the mowed plant life.

Since the feeler bar 29 is now above the mowed plant lift, it does not contact same and the electric circuit is broken. the voltage drop across the potentiometer 37 is eliminated. The bias voltage then reduces the current flow through the tube 40 and the relay 43 to a value which is insufficient to maintain the relay 43 in the closed position. With the relay 43 open, the relay 46 changes contacts and the opposite field coil and the armature in the reversible guiding motor R are now energized.

This reverses the direction in which the motor R runs, and the swinging feeler bar 29 and the guiding wheel 19 now move into the unmowed plant life. The guiding cycle continuously repeats with the feeler bar 29 having a relatively small vibratory lateral movement adjacent the vertical plane separating the mowed and unmowed plant life.

The capacitors 48 and 49 are connected to the leads of the reversible guiding motor R to minimize arcing at the contacts of the relays 46, and a capacitor 50 is used to minimize arcing of the contacts of the relay 43.

An 8 amp. fuse 51 is used to protect the generator 12 volt circuit and the control circuit further includes a manual control switch 52.

While the invention has been disclosed in accordance with a single specific structural embodiment thereof, such is to be considered as illustrative only, and not restrictive, the scope of the invention being defined in the subjoined claims.

I claim:

1. A guiding attachment for a mowing machine or harvester, comprising a vertical steering shaft, bearing means for said shaft, a guide wheel rotatably supported on the lower end of said shaft, a pulley secured to said shaft, a reversible motor supported adjacent said shaft, and provided with a pulley, a belt surrounding said pulleys, an elongated feeler bar disposed in advance of said steering shaft and connected thereto for movement therewith, said feeler bar in use being disposed above the cut plant growth and below the top of the uncut plant growth and adapted to be normally disposed adjacent the vertical plane of the junction of cut and uncut plant growth, a dual-output generator supported adjacent said motor and adapted to supply current thereto and to said feeler bar for electrically charging same, means grounding said attachment, said feeler bar upon movement into the unmowed plant growth through rotation of said steering shaft by said motor, making a circuit and upon opposite movement to a position above the cut plant growth breaking the circuit, and electric means operative upon movement of said feeler bar for reversing said motor upon making and breaking the circuit, whereby said steering wheel is caused to move in a line substantially parallel to the line of demarcation between the cut and uncut plant growth.

2. A guiding attachment according to claim 1, wherein said bearing means comprises a vertical tube, a washer disposed beneath said tube and rigidly secured to said steering shaft, an elongated tubular member having one end thereof secured to said washer by hinge means providing for vertical swinging movement of the said tubular member, and said feeler bar being disposed beneath said tubular member and secured thereto by insulating means.

3. The structure according to claim 2, together with a transversely disposed arm which is secured centrally thereof to said washer and to which said one end of said tubular member is hingedly secured, and a pair of guy wires having corresponding ends thereof secured to the respective opposite ends of said transversely disposed arm and the opposite ends thereof being secured to said elongated tubular member.

4. The structure according to claim 2 together with an elongated tube disposed above and transversely of said elongated tubular member and secured thereto at a point substantially centrally of said feeler bar, and a ground engageable swivel caster wheel secured to each end of said elongated tube.

5. The structure according to claim 2 wherein said feeler bar comprises a central longitudinal portion and opposite end portions diverging upwardly from opposite ends of said central portion, and the terminals of said end portions being secured to said elongated tubular member by said insulating means.

References Cited in the file of this patent

UNITED STATES PATENTS

| | | |
|---|---|---|
| 2,496,727 | Jenkins | Feb. 7, 1950 |
| 2,509,914 | Goodwine | May 30, 1950 |
| 2,610,562 | Ward | Sept. 16, 1952 |
| 2,751,030 | Null | June 19, 1956 |